United States Patent

[11] 3,627,415

[72] Inventor Gerhard A. Nothmann
  Wilmette, Ill.
[21] Appl. No. 882,460
[22] Filed Dec. 5, 1969
[45] Patented Dec. 14, 1971
[73] Assignee Robertson Photo-Mechanix, Inc.
  Des Plaines, Ill.

[54] COPYBOARD HAVING AUTOMATIC LATCH RELEASING MEANS
  12 Claims, 6 Drawing Figs.

[52] U.S. Cl. .................................................... 355/75
[51] Int. Cl. ............................................. G03b 27/62
[50] Field of Search ............................... 355/75, 76, 39

[56] References Cited
UNITED STATES PATENTS
3,198,069  8/1965  Florsheim, Jr. et al. ...... 355/75
2,758,503  8/1956  Luffman et al. .............. 355/75
3,089,385  5/1963  Wanielista ..................... 355/75

Primary Examiner—Samuel S. Matthews
Assistant Examiner—Russell E. Adams, Jr.
Attorney—Hill, Sherman, Meroni, Gross & Simpson ABSTRACT: In graphic arts camera apparatus, a copyboard mounted on a frame for tiltable movement and having a cover section hinged to a base section and releasable latch for fastening the sections together is characterized by a latch actuator for automatically releasing the latch to permit separation of the hinged sections whenever the copyboard tilts from a vertical exposing position to a horizontal loading and unloading position. A catch mechanism prevents inadvertent release of the latch when the copyboard is vertically disposed, and the latch is biased toward a latched position to facilitate fastening the sections subsequent to loading the copyboard.

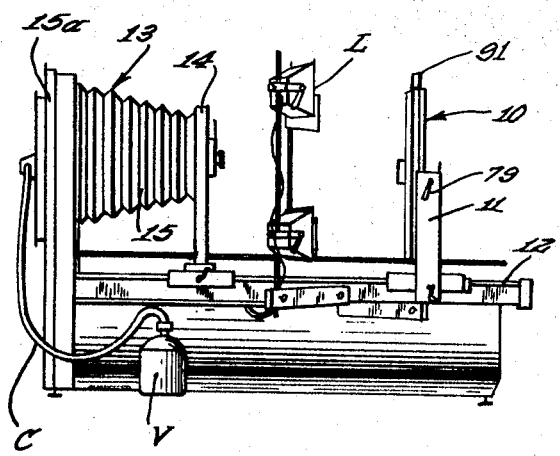
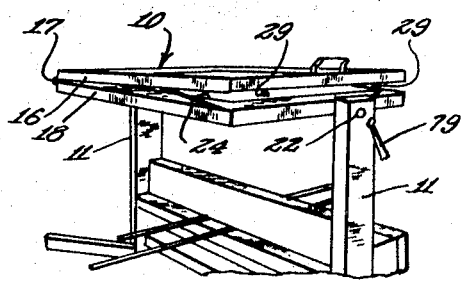
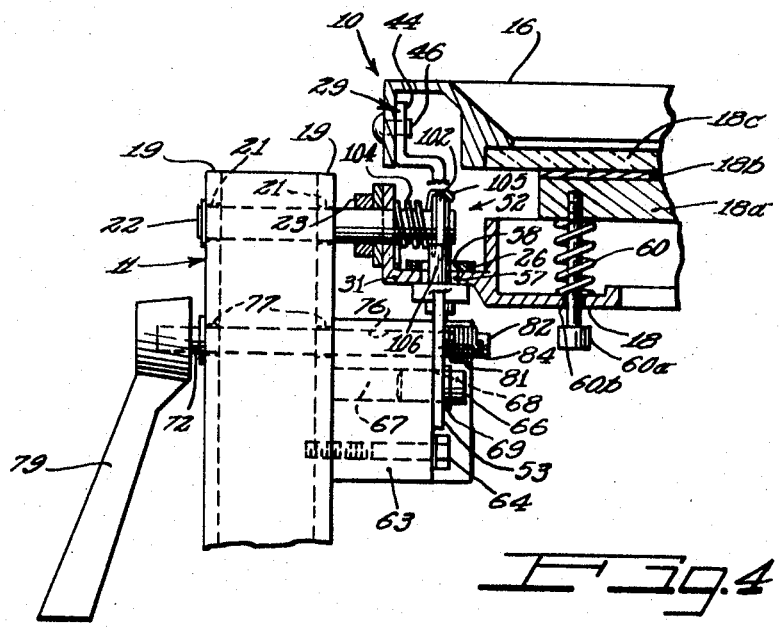
INVENTOR.
Gerhard A. Nothmann

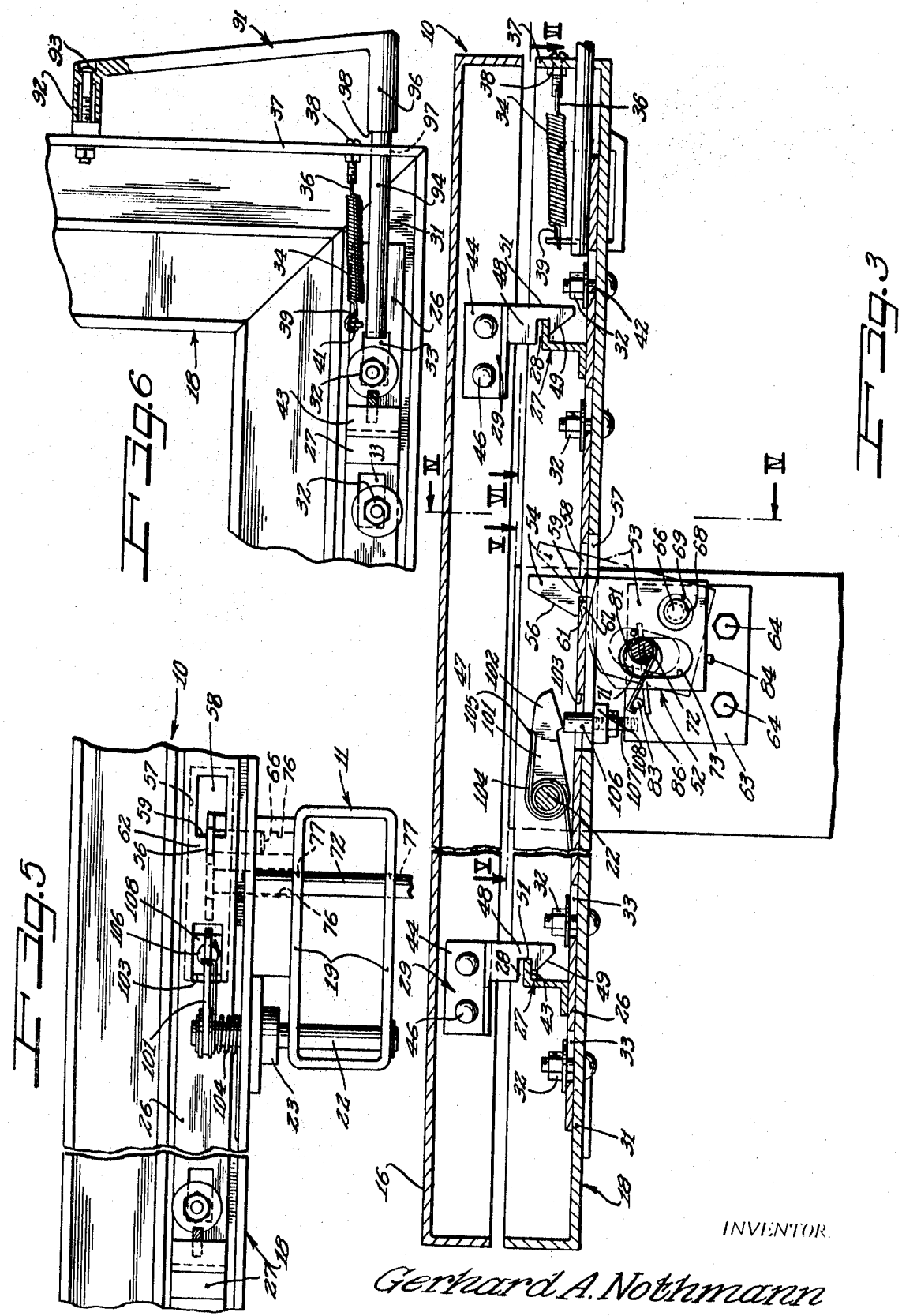

COPYBOARD HAVING AUTOMATIC LATCH RELEASING MEANS

BACKGROUND OF THE INVENTION

1. Field of the Invention

This invention relates to a copyboard construction for graphic arts camera apparatus, and more particularly to a copyboard mechanism having means automatically actuating releasable latching means whenever the copyboard moves to a predetermined loading position offset from an exposing position for facilitating loading and unloading the copyboard.

2. Description of the Prior Art

Process cameras for use in graphic arts, printing, photofabrication and similar applications generally have a base slidably supporting a camera and a frame having a copyboard mounted thereon for tiltable movement selectively between a vertical exposing position and a horizontal loading and unloading position. Material to be exposed is positioned on a support surface or a copyboard base section and held in position by a cover section hinged to the base and having a transparent glass window.

Improved productivity of process cameras requires rapid loading and unloading of the copyboard. Copyboards heretofore available have been a source of lost time because of the various manual movements required to unlatch the cover section, position the material and securely fasten the cover to the base.

Further, inadvertent unlatching of the cover while the copyboard is disposed in a position offset from the horizontal position may result in breakage of the glass window or possibly other damage.

SUMMARY OF THE INVENTION

In accordance with the present invention, a copyboard for a graphic arts camera or light-exposure system is mounted on a frame for tiltable movement between a vertical exposing position and a horizontal loading and unloading position and has means attached to the frame for automatically releasing latching means fastening a hinged cover section to a base section as the copyboard approaches the horizontal position. A portion of the latch releasing means restrains the copyboard base and springs in the base, which push material to be exposed against a glass window, urge the unlatched cover away from the clamped base, thereby to automatically open the copyboard without requiring separate manual operations.

The latching means generally comprise a latch bar mounted in the base for reciprocal movement between latched and unlatched positions, complemental latch portions attached to the cover and forming recesses for receiving detents carried by the latch bar, and biasing means urging the latch bar toward the latch position wherein the detents are received in the recesses.

As the cover is pivoted toward the base for clamping a properly positioned piece of copy or other material to be exposed, camming surfaces on the cover latch portions move the latch bar toward the unlatched position for enabling the biasing means to urge the detents into the recesses, thereby automatically latching the cover without requiring separate manual operations. A handle portion extends exteriorly of the copyboard and has an end portion attached to the latch bar to permit manual unlatching while the copyboard is horizontally disposed, thereby to enable correcting alignment of the piece of copy, if necessary.

After loading, the clamping portion of the latch releasing means is tilted clear of the base to free the copyboard for tilting movement toward the vertical exposing position.

In order to prevent inadvertent unlatching while the copyboard is vertically disposed, as the copyboard tilts from the horizontal position a catch mechanism engages the latch bar for restraining reciprocal movement thereof. An abutment on the frame moves the catch clear of the latch bar as the copyboard approaches the horizontal to permit release of the latch by the automatic latch releasing means.

BRIEF DESCRIPTION OF THE DRAWINGS

FIG. 1 is a side elevational view of a graphic arts camera including a copyboard constructed in accordance with the principles of the present invention and illustrating the copyboard in a vertical, exposing position;

FIG. 2 is a perspective view of the copyboard shown in FIG. 1 and illustrating the copyboard in a horizontal loading and unloading position;

FIG. 3 is a transverse sectional view taken along an edge of the copyboard and illustrating latching means and automatic latch releasing means embodying the principles of the present invention;

FIG. 4 is a fragmentary sectional view taken substantially along line IV—IV of FIG. 3;

FIG. 5 is a fragmentary sectional view taken substantially along line V—V of FIG. 3; and FIG. 6 is a sectional view taken substantially along line VI—VI of FIG. 3.

DETAILED DESCRIPTION OF A PREFERRED EMBODIMENT

Referring to the drawings, a copyboard mechanism 10, constructed in accordance with the principles of the present invention, is journaled between a pair of upright framing members 11, 11 which in turn are slidably supported on rails as at 12 forming a bed for a graphic arts camera. A camera 13 is supported on the camera bed 12 at an end thereof opposite the copyboard 10 and has a front lens case 14 carried on the rails 12 for slidable movement toward and away from the copyboard to focus the camera. The camera 13 includes a bellows 15 and a vacuum film holder 15a operatively connected to a vacuum source V by a conduit C. It will be understood that, depending on the size of the camera, the vacuum film holder 15a may be located in a dark room while the copyboard 10 is located in a gallery. The camera construction also includes illumination means such as the lights L for suitably illuminating the copyboard 10.

The copyboard 10 includes a cover or front section 16 hingedly connected for pivotal movement along an edge as at 17 to a base or back section 18. The base or back section 18 provides a support surface which may include a resiliently mounted pad 18a against which a piece of copy 18b is disposed, and the cover 16 has a transparent glass window 18c abutting the piece of copy, thereby to clamp the piece of copy between the copyboard sections.

The upright framing members 11 comprise box-shaped channel members each having a pair of parallel sidewalls as at 19 characterized by aligned apertures 21 for receiving one end portion of a pair of shafts as at 22. The other end of the shafts 22 are journaled into a pair of bearing blocks as at 23 attached to opposite end edge portions of the base or back section 18 for pivotally mounting the copyboard 10 between the pair of framing members 11, 11 for tiltable movement about a horizontal axis extending perpendicularly to an axis of the hinged connection 17. The copyboard 10 may be tilted selectively between a vertical, exposing position, as shown in FIG. 1, and a horizontal loading and unloading position, as illustrated in FIG. 2.

To assist an operator in opening and closing the hinged cover 16 and to control positioning of the cover, counterbalancing spring means as at 24 may be pivotally mounted at opposite sides of the sections 16 and 18, as illustrated in FIG. 2.

Latching means fastening the cover section 16 to the base section 18 for clamping the piece of copy 18c between the pad 18a and the window 18c comprise a latch bar 26 mounted on the base section for reciprocation therealong. The latch bar 26 has detents as at 27 for releasably engaging recesses as at 28 formed in latch fingers 29 attached to the cover section.

The latch bar 26 is an elongated strip-form member disposed along a wall 31 of the base 18. A plurality of nut and bolt assemblies as at 32 pass through spaced-apart apertures formed in the wall 31 and are received in elongated attachment apertures as at 33 formed in the latch bar 26 to permit longitudinally directed, reciprocal movement of the latch bar relative to the base section 18 selectively between a latched position, as illustrated in FIG. 3, and an unlatched position wherein the latch bar is shifted to the left of the position shown in FIG. 3.

Biasing means urge the latch bar 26 toward the latched position and comprise a tension spring 34 having one end portion as at 36 secured to a sidewall 37 of the base member 18 by a screw fastener 38 and another end 39 anchored to the latch bar by means of an upstanding tab 41. At least one of the attachment slots 33 has an end wall as at 42 forming an abutment surface engaging the associated nut and bolt assembly 32 for limiting movement of the latch bar toward the latched position under the influence of the tension spring 34.

The detents 27 include Z-shaped members having an upper leg 43 spaced from and extending parallel with the latch bar 26 and aligned with the recesses 28 formed in latch fingers 29 when the cover is firmly closed. The latch fingers 29 are Z-shaped in configuration and have a planar portion 44 apertured for receiving fastening means such as rivets as at 46 for attaching the fingers to a cover end wall 47. A portion 48 of each of the latch fingers 29, is spaced from and extends parallel to the planar portion 44. A recess 28 is formed in each respective latch finger 29 for receiving a detent 27. Each portion 48 has an angular camming surface as at 49 disposed to incline downwardly away from the detents 27. Thus, when the cover section 16 is pivoted about the hinged connection 17 toward the base 18, a lowermost end of the camming surface 49 will engage the leading edge 51 of a corresponding detent 27. Further movement of the cover toward the closed position will cam the latch bar 26 against the bias of the tension spring 34 and toward the unlatched position, thereby enabling the detents 27 to be received in the recesses 28.

In accordance with the principles of the present invention, automatic latch releasing means are provided which are shown generally at 52.

The automatic latch releasing means 52 comprise a plate member 53 having a generally upwardly extending actuating portion or finger 54 characterized by an angular camming surface 56. The baseplate wall 31 has an elongated clearance aperture 57 formed therein for receiving the actuating portion 54 as the copyboard approaches the horizontal position, and the latch bar 26 has an elongated aperture 58 in alignment with the clearance aperture 57 and characterized by an end wall 59 forming an abutment surface disposed for engagement with the camming surface 56.

As the copyboard 10 approaches the horizontal loading and unloading position, the abutment surface 59 engages an upper end portion of the camming surface 56 formed on the plate 53. Further movement toward the horizontal position causes the abutment surface to ride along the cam surface 56 and thus shifts the latch bar 26 against the bias of the tension spring 34 and toward the unlatched position for unlatching the cover 16. The camming surface 56 is sized in a direction parallel to the latch bar movement so that the latch bar is shifted a greater distance than the overlap between the detents 27 and the recesses 28 to unlatch the copyboard sections 16 and 18.

With the latch bar 26 in the unlatched position, compression springs 60, which resiliently support the pad 18a urge the cover 16 away from the base 18 to slightly separate the respective copyboard sections. A plurality of the springs 60 are disposed around the base 18, and each of the springs encircles a machine screw 60a and has opposite end portions operatively engaging the pad and the base. Each of the machine screws 60a passes through a clearance aperture 60b in the base 18 and engages into the pad 18a, thereby to permit limited movement of the pad relative to the base.

In order to lock the base section 18 into the horizontal position, the actuating portion or finger 54 has a recess 61 for receiving a peripheral edge portion 62 of the aperture 58. Thus, when the base section 18 is aligned in the horizontal position, the peripheral edge portion 62 is in alignment with the recess 61 and will be urged by the tension spring into locking engagement therewith. A closing of the cover 16 will cause a movement of the latch bar 26, as a result of engagement between the camming surfaces 49 and the detents 27, less than the amount necessary to produce disengagement between the latch bar 26 and the finger 54.

It is also contemplated by the present invention to tiltably mount the latch releasing plate 53 and to provide means for tilting the plate 53 to a release position. The latch releasing plate 53 is vertically disposed along a support block 63 which in turn is secured to the framing member 11, disposed adjacent the end of the copyboard mounting the latch bar 26, by means of bolts 64. A pin 66 has one end portion press fit into an aperture 67 formed in the support block 63 and another end portion loosely received in a clearance aperture 68 formed in the plate 53. The axis of the pin 66 is disposed directly beneath the camming surface 56. A snapring 69 or other suitable fastening means engages the pin 66 and overlies peripheral edges of the clearance aperture 68, thereby to pivotally mount the plate 53 on the pin for tiltable movement selectively between an upright position, wherein the abutment surface 59 will engage the camming surface 56 for unlatching the latch means, and a release position, wherein the recess 61 is withdrawn from engagement with the peripheral locking edge 62.

In order to selectively tilt the latch releasing plate 53 toward the release position, an eccentric cylindrical surface 71 is formed on a control shaft 72 and is received in a vertically elongated slot 73 formed in the latch releasing plate 53 and laterally offset from the clearance aperture 68. The control shaft 72 is journaled in aligned apertures 76 and 77 respectively formed in the support block 63 and the framing member sidewalls 21, and an actuating handle 79 secured at an end of the control shaft projecting outwardly of the framing member 11 permits manual operation of the release mechanism, thereby to enable movement of the copyboard from the loading position to the exposing position. The axis of the control shaft 72 extends at right angles to a plane containing the plate 53 and parallel with the axis of the pivot pin 66 and is laterally and upwardly offset therefrom, thereby to pivot the latch release plate 53 in a clockwise direction whenever the control handle 79 is manually pivoted in a counterclockwise direction. Further, the mechanical advantage provided by the eccentric surface 71 prevents rotational movement of the plate 53 about the pin 66 as the latch bar 26 engages the camming surface 56 to unlatch the cover 16.

A torsion spring 81 wrapped around the innermost end 82 of the control shaft 72 and anchored against a pin 83 press fit into the support block 63 biases the control shaft toward a clockwise direction and thus biases the latch releasing plate 53 toward the upright position. The pin 83 along with another pin 84 angularly offset from the first pin form abutments engaged by a pin 86 extending laterally from the control shaft 72, thereby to provide stops limiting pivotal movement of the control shaft.

In order to permit unlatching while the copyboard 10 is disposed in the horizontal loading and unloading position, for example to realign a workpiece subsequent to initially closing the cover, a handle 91 has one end portion as at 92 pivotally connected to the sidewall 37 of the base section 18 by means of a bolt and nut assembly 93 and is characterized by a rod 94 extending from the other handle end 96 through a clearance opening 97. The rod 94 is attached by welding or other suitable means to the latch bar 26, and thus, an inwardly directed force pivots the handle 91 to slide the latch bar 26 toward the unlatching position. To permit unlatching of the bar 26 while preventing release of the base 18 from the horizontal loading position, the detents 27 are received in the recesses 28 a distance less than the overlap between the peripheral edge 62 of the aperture 58 and the actuating finger 54. A shoulder 98 on the handle end 96 forms an abutment to limit movement of the latch bar 26 by the handle 91 to a distance less than the overlap between the edge 62 and the finger 54 but great enough to shift the detents 27 clear of the recesses 28. Thus, the latch bar 26 may be manually shifted to the unlatched position without releasing the base 18 from the loading position.

It is also contemplated by the present invention to provide a catch mechanism for engaging the latch bar 26 as the copyboard 10 tilts upwardly from the horizontal position to restrain movement of the latch bar for preventing inadvertent unlatching of the cover, which may cause breakage of the glass window 18c and possibly other damage. The catch mechanism includes a catch member 101 having one end portion journaled on the pivot shaft 22 and an opposite end portion formed with an offset portion 102. An elongated slot 103 formed in the latch bar 26 receives the offset portion 102 on the catch 101 and is sized relative to the offset portion for restraining movement of the latch bar 26 toward the unlatching position whenever the catch is properly engaged therein. A torsion spring 104 embraces the pivot shaft 22 and has an end 105 engaging the catch for biasing the same downwardly toward the latch bar 26.

Release means for the catch mechanism include an upstanding abutment 106 adjustably threadedly attached to a stud 107 projecting upwardly from the support block 63. The abutment 106 is disposed relative to the catch receiving slot 103 and the clearance slot 57 to pass therethrough and engage a lower edge of the catch offset portion 102 as the copyboard 10 approaches the horizontal position, thereby pivoting the catch member 101 against the bias of the torsion spring 104 and out of engagement with the slot 103. Also, as the copyboard 110 is upwardly tilted about the pivot shaft 22 toward the vertical position the slot 103 moves away from the abutment 106, thereby enabling the catch 101 to pivot under the influence of the torsion spring 104 to a position wherein the offset portion 102 engages the slot 103.

An enlarged portion 108 on the abutment post 106 engages peripheral edge portions of the clearance slot 57 formed in the wall 31 of the base section 18 for providing an adjustable stop to determine the horizontal loading and unloading position of the copyboard 10.

Although those versed in the art might suggest various minor modifications, it should be understood that I wish to embody within the scope of the patent warranted hereon all such modifications as reasonably and properly come within the scope of my contribution to the art.

I claim as my invention:

1. In a copyboard mechanism, for use in a light-exposure system, including a base section and a cover section hingedly connected to the base section and support means having one of said sections journaled thereon for tiltable movement between a vertical exposing position and a horizontal loading and unloading position, the improvement comprising:
    releasable latch means fastening the cover section to the base section for clamping work pieces therebetween, said latch means comprising
      a latch bar mounted on the base section for reciprocal movement selectively between a latched position and an unlatched position,
      means forming detents attached to one of said latch bar and the cover section, and
      means forming latch portions attached to the other one of said latch bar and the cover section and having recesses formed therein for receiving said detents;
    automatic latch releasing means having a camming surface engaging a portion of said latch bar for shifting the same toward the unlatched position as the copyboard approaches the horizontal loading and unloading position, said latch releasing means comprising a plate member formed with an upstanding portion having said camming surface formed thereon and disposed to be engaged by a portion of said latch bar as the copyboard sections approach the horizontal position.

2. A copyboard as defined in claim 1 and further characterized by:
    said latch bar having a slot formed therein and disposed to receive said upstanding portion on said latch releasing plate member,
      said slot having an end wall engaging said camming surface as the copyboard sections approach the horizontal position; and
    biasing means interconnecting said latch bar and a portion of said base section and normally urging said latch bar toward the latched position.

3. A copyboard as defined in claim 2 and further characterized by:
    said latch releasing means including means forming a recess in said plate member disposed to receive a peripheral edge of said slot adjacent said one end wall whenever said base section tilts into the horizontal loading and unloading position,
    whereby said biasing means urges said peripheral edge of said slot into said plate recess to lock said base section into the horizontal position.

4. A copyboard as defined in claim 5 and further characterized by:
    said latch releasing means having means supporting said plate for tiltable movement selectively between a first position wherein said peripheral edge lockingly engages said plate recess whenever said latch bar is in the latched position and a second position wherein said plate recess is withdrawn from locking engagement with said peripheral edge portion;
    means for tilting said plate member selectively between the first and second positions thereof.

5. A copyboard as defined in claim 4 and further characterized by:
    said means for tilting said plate member comprising
      a control shaft journaled in said support means;
      a cylindrical surface eccentrically formed on said shaft;
      an elongated slot formed in said plate and receiving said eccentrically formed cylindrical surface,
    whereby rotation of said control shaft in one angular direction tilts said plate member about the tilting axis from the first position to the second position for enabling said base section to be tilted from the horizontal position.

6. In a copyboard, for use in a light-exposure system, including a base section and a cover section hingedly connected to the base section and support means having one of the sections journaled thereon for tiltable movement between a vertical exposing position and a horizontal loading and unloading position, the improvement comprising:
    releasable latch means fastening the cover section to the base section for clamping work pieces therebetween;
    abutment means attached to the support means and forming a horizontal stop surface engageable with the base section whenever the copyboard sections are pivoted to the horizontal loading and unloading position;
    automatic latch releasing means operating on said releasable latch means as the copyboard sections approach the horizontal position for releasing said latch to permit separation of the sections; and
    said latch releasing means including locking means for retaining the base section in abutting engagement with said stop surface and being releasable to permit pivoting said sections toward the vertical position.

7. A copyboard as defined in claim 1 and further characterized by:
    a catch mechanism having a catch member mounted adjacent said reciprocally movable latch bar for movement selectively toward and away from said bar;
    means forming an aperture in said latch bar for receiving a portion of said catch member;
    said aperture sized relative to said catch portion for restraining reciprocal movement of said latch bar whenever said catch is engaged in said aperture;
    biasing means normally urging said catch member towards said latch bar and into engagement with said latch bar aperture; and means forming an upstanding post attached to said support means and disposed to engage said catch member for moving the same against said biasing means and away from said latch bar as said copyboard approaches the horizontal position.

8. A copyboard as defined in claim 1 and further characterized by:
means forming a handle portion attached to said latch bar and extending exteriorly of said copyboard;
mounting means supporting said handle for reciprocal movement in directions parallel with reciprocal movement of said latch bar,
thereby enabling manual movement of said latch bar between the latched and unlatched positions.

9. In a copyboard mechanism, for use in a light-exposure system, including a base section and a cover section hingedly connected to the base section and support means having one of said sections journaled thereon for tiltable movement between a vertical exposing position and a horizontal loading and unloading position, the improvement comprising:
releasable latch means fastening the cover section to the base section for clamping work pieces therebetween and including a latch bar mounted on the base section for reciprocal movement selectively between a latched position and an unlatched position;
automatic latch releasing means operating on said latch bar as the copyboard sections approach the horizontal position for releasing said latch means to enable separation of the copyboard sections;
said latch releasing means comprising means lockingly engaging said latch bar after the release of said latch means for retaining the base section in a horizontal loading and unloading position.

10. A copyboard mechanism as defined in claim 9, further characterized by:
biasing means normally urging said latch bar towards the latch position; and
said automatic latch releasing means comprising a plate member having a camming surface formed thereon and disposed to be engaged by a portion of said latch bar as the copyboard sections approach the horizontal position;
said camming surface being configured to move said latch bar against said biasing means for releasing said latch means; and
said camming surface having a recess formed therein and disposed to receive a portion of said latch bar in locking engagement therewith whenever the base section is in the horizontal loading and unloading position.

11. A copyboard as defined in claim 10 and further characterized by:
means forming detents attached to one of said latch bar and the hinged cover section;
means forming latch portions attached to the other one of said latch bar and the hinged cover section and having latching recesses formed therein for receiving said detents; and
said recess formed in said camming surface being sized relative to said detents and said latching recesses to permit movement of said latch bar against said biasing means a distance sufficient to unlatch the cover section without moving said latch bar out of locking engagement with said recess formed in said camming surface.

12. A copyboard as defined in claim 10 and further characterized by:
said latch releasing means including means supporting said plate for tiltable movement selectively between a first position wherein said recess in said camming surface is disposed for locking engagement with said latch bar and a second position wherein said recess is withdrawn from locking engagement with said latch bar; and
means for tilting said plate member selectively between the first and second positions thereof.

* * * * *